United States Patent [19]
Pim et al.

[11] Patent Number: 5,314,149
[45] Date of Patent: May 24, 1994

[54] SNAP-IN MOUNT FOR HOUSING WITHIN PANEL

[75] Inventors: Kendall A. Pim, Cleveland Heights; Alfred J. Romanak, Broadview Heights; Russell W. Moss, Richmond Heights, all of Ohio

[73] Assignee: Channel Products, Inc., Chesterland, Ohio

[21] Appl. No.: 41,784

[22] Filed: Apr. 1, 1993

Related U.S. Application Data

[63] Continuation of Ser. No. 705,309, May 24, 1991, abandoned.

[51] Int. Cl.$^5$ .............................................. F16L 3/00
[52] U.S. Cl. ...................................... 248/56; 248/73
[58] Field of Search ............. 248/221.4, 222.4, 220.2, 248/220.3, 221.3, 27.1, 73, 56, 231.9, 231.91; 174/153 G, 65 G; 74/502.4, 502.5, 502.6

[56] References Cited

U.S. PATENT DOCUMENTS

| | | | |
|---|---|---|---|
| 3,427,894 | 2/1969 | Tschanz | 74/502.4 |
| 3,631,738 | 1/1972 | Harper | 74/502.4 |
| 3,645,150 | 2/1972 | Crossland | 74/502.4 |
| 4,137,602 | 2/1979 | Klumpp, Jr. | 248/56 X |
| 4,304,148 | 12/1981 | Hamman | 74/502.4 |
| 4,333,361 | 6/1982 | Spease | 74/502.4 |
| 4,687,164 | 8/1987 | Bakhaus | 248/221.4 |

FOREIGN PATENT DOCUMENTS

| | | | |
|---|---|---|---|
| 2020204 | 11/1971 | Fed. Rep. of Germany | 248/221.4 |
| 2408173 | 6/1979 | France | 74/502.4 |
| 539640 | 9/1941 | United Kingdom | 248/221.4 |

Primary Examiner—Karen J. Chotkowski
Attorney, Agent, or Firm—James A. Hudak

[57] ABSTRACT

An integrally molded housing having outwardly directed, spaced-apart arms thereon for mounting within or attachment to a panel is disclosed. The arms are located on the body portion of the housing such that a distance slightly less than the thickness of the panel in which the housing is to be received exists between the end of each arm and a circumferential flanged surface on the housing. As the housing is being received through the panel, the arms are deflected inwardly and then spring outwardly causing a surface on the end of each arm to engage a surface on a complementary keyway in the panel. Another surface is provided on the end of each arm to prevent the disengagement of the arm from the surface surrounding its adjacent complementary keyway upon longitudinal movement of the housing toward the panel. The housing can be readily removed from the panel by the application of inwardly directed pressure on the arms.

6 Claims, 2 Drawing Sheets

SNAP-IN MOUNT FOR HOUSING WITHIN PANEL

This is a continuation of copending application(s) Ser. No. 07/705,309 filed on May 24, 1991 and now abandoned.

TECHNICAL FIELD

The present invention relates, in general, to a structure for a housing permitting mounting of the housing within a panel and, more particularly, to a housing having outwardly directed arms permitting the housing to be readily mounted within a panel and to be retained therein by the arms.

BACKGROUND ART

Various approaches are available for mounting a housing, such as piezoelectric igniter housing, within or to a panel. For example, one of the most obvious approaches is to provide threads on the outer surface of the housing adjacent a shoulder on same. The housing can then be received through an aperture in the panel and a nut can threadably engage the threads causing the panel to be captured between the nut and the shoulder on the housing. Alternatively, a bracket can be utilized to receive the housing and to attach same to the panel. A still another approach requires the use of a specially designed clip or fastener to attach the housing to the panel. A still another approach utilizes a bushing which surrounds the housing. After the housing and bushing have been received through an aperture in the panel, it is virtually impossible to remove the housing from the panel without destroying the bushing and/or damaging the housing. From the foregoing, it is apparent that all of these approaches require the use of an additional component, e.g., a nut, bracket, clip, fastener, bushing, etc., in order to mount the housing within or to the panel, thus increasing the cost of the overall assembly.

Because of the foregoing disadvantages associated with the prior art approaches for mounting a housing within or to a panel, it has become desirable to develop a housing which can be mounted within a panel without the use of an additional component and which permits the housing to be easily removed from the panel.

SUMMARY OF THE INVENTION

The present invention solves the problems associated with prior art approaches for mounting a housing, such as a housing for a piezoelectric igniter, within a panel. The housing of the present invention includes a body portion having two outwardly directed, angularly spaced-apart arms that are integrally molded thereto. The arms are located on the body portion such that a distance slightly less than the thickness of the panel in which the housing is to be mounted exists between the end of each arm and a circumferential flanged surface on the body portion. The panel in which the housing is to be mounted is provided with an aperture including oppositely disposed keyways therein. The apertures are sized and positioned so as to be complementary to the angularly spaced-apart arms. The aperture has a diameter slightly greater than the diameter of the body portion permitting the body portion to be received therethrough. A lead-in portion on each arm acts as a locating surface for the housing as the body portion and arms are received through the aperture and keyways, respectively, in the panel. As the body portion and arms are being received through the panel, the arms are deflected inwardly toward the body portion as a result of the contact by the arms with the surfaces defining their complementary keyways. After the body portion and the arms have been substantially received through the panel, the arms spring outwardly causing a surface on the end of each arm to engage a surface on its complementary keyway in the panel. The engaging surface on each arm is angularly oriented with respect to the arm urging further advancement of the housing through the panel until the panel firmly engages the circumferential flanged surface on the body portion. The angular orientation of the foregoing arm engaging surface prevents the disengagement of the arm from the surface defining the complementary keyway as a result of inadvertent movement of the housing within the aperture. The housing can be readily removed from the panel by the application of inwardly directed pressure on the arms causing the disengagement of the ends of the arms from the surfaces defining the keyways within the panel.

DESCRIPTION OF THE PREFERRED EMBODIMENT

Figure 1:
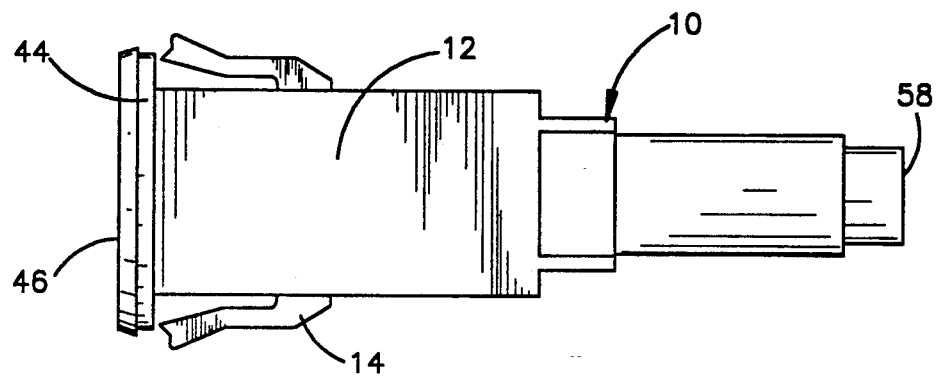
FIG. 1 is a front plan view of the present invention and illustrates a piezoelectric igniter housing having a body portion and outwardly directed, spaced-apart arms which are integrally molded thereto.

Referring now to the drawings where the illustrations are for the purpose of describing the preferred embodiment of the present invention and are not intended to limit the invention described herein, FIG. 1 is a front plan view of a housing 10 comprising a body portion 12 and outwardly directed, spaced-apart arms 14 which grippingly engage the inner surface of a panel after the housing 10 has been received therein. The housing 10 is comprised of a number of sections, most sections having a generally circular cross-section. The body portion 12 and the outwardly directed arms 14 are typically molded as a one-piece construction from glass filled nylon material or the like.

Figure 2:
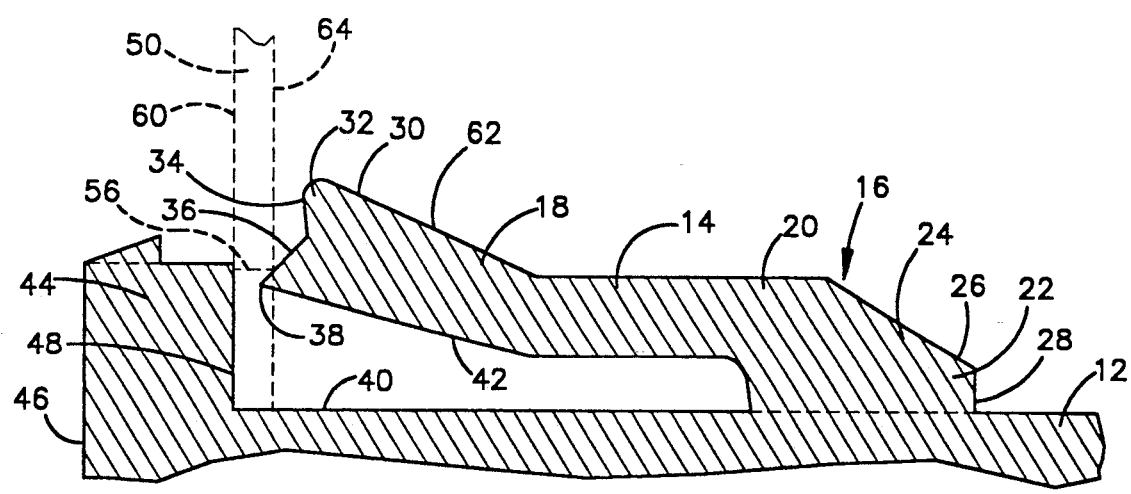
FIG. 2 is an enlarged partial cross-sectional view of the housing shown in FIG. 1 and illustrates an outwardly directed arm.
Figure 3:
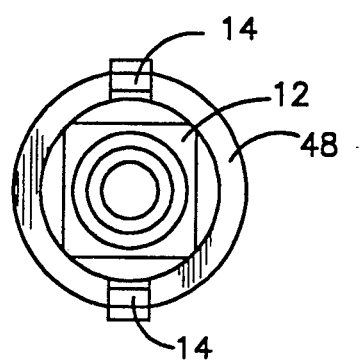
FIG. 3 is a right end view of the housing shown in FIG. 1.

FIG. 2 is an enlarged partial cross-sectional view of the body portion 12 and an arm 14 attached thereto. It should be noted that typically two arms 14 are integrally molded to the body portion 12 and are spaced approximately 180° apart, however, any number of arms can be provided and substantially equal angular spacing between same is not required. Arm 14 is comprised of a lead-in portion shown generally by the numeral 16, a ramp portion 18, and a middle portion 20 interposed therebetween. The lead-in portion 16 includes a shoulder portion 22 which is integrally molded to the outer periphery of the body portion 12 and an angular portion 24 which is interposed between the shoulder portion 22 and the middle portion 20 of the arm 14. The outer surface 26 of angular portion 24 forms an angle of approximately 60° with respect to surface 28 of the shoulder portion 22 and acts as a lead-in and/or locating surface when the housing 10 is inserted through an aperture in the panel and the aperture has one or more keyways formed therein. Surface 28 of shoulder portion 22 is substantially perpendicular to the longitudinal axis of the body portion 12. It should be noted that outer surface 26 may be continuous from middle portion 20 of arm 14 to body portion 12, thus eliminating surface 28 of the shoulder portion 22. The middle portion 20 of the arm 14 has a substantially constant cross-sectional area and is substantially parallel to the body portion 12. The ramp portion 18 of the arm 14 is flared slightly outwardly (approximately 15°) with respect to the middle portion 20 of the arm 14 and the body portion 12 of the housing 10. (It should be further noted that the outer surfaces of angular portion 24, middle portion 14 and ramp portion 18 may be continuous, in one plane, and flared outwardly thus eliminating any junctions between the foregoing portions.) The ramp portion 18 has a generally increasing cross-sectional thickness in the transverse direction from its junction with the middle portion 20 of the arm 14 to its outer end 30. A rounded projection 32 is provided adjacent outer end 30 and terminates in surface 34 which acts as a mechanical stop, as hereinafter described, after the body portion 12 and arms 14 have been received through an aperture in the panel. A surface 36 interconnects surface 34 with inner end 38 of arm 12. Surface 36 is oriented at an angle of about 45° with respect to the longitudinal axis of the body portion 12 of the housing 10. The transverse width of the arm 14 is substantially constant throughout its entire length, as shown in FIG. 3. The transverse distance between inner end 38 of arm 12 and surface 40 of body portion 12 is greater than the transverse inward deflection of ramp portion 18 when arm 14 is being received through a keyway in the panel, as hereinafter described, preventing the inner surface 42 of ramp portion 18 from being compressed against surface 40.

Figure 4:
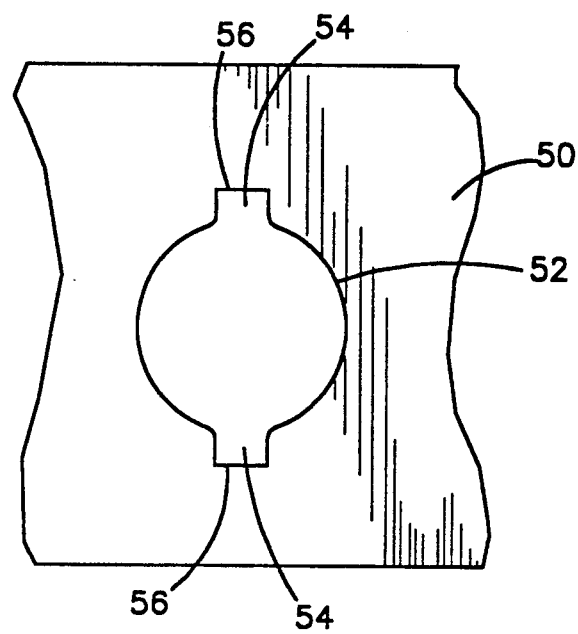
FIG. 4 is a front plan view of a panel within which the housing shown on FIG. 1 is to be mounted.
Figure 5:
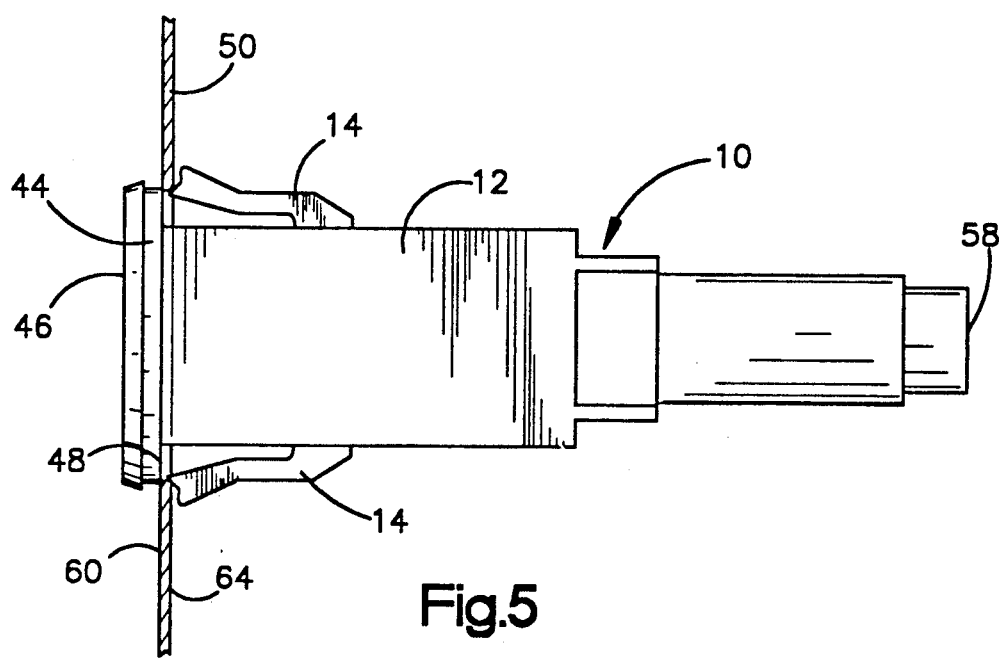
FIG. 5 is a cross-sectional view illustrating the housing shown in FIG. 1 and its mounting within a panel.

The body portion 12 has a circumferential flange portion 44 adjacent end 46 thereof. The arms 14 are located on the body portion 12 such that a distance slightly less than the thickness of the panel through which the housing 10 is to be received exists between the inner end 38 of each arm 14 and inner surface 48 of the circumferential flange portion 44 of the body portion 12. Referring now to FIGS. 4 and 5, a panel 50 through which the housing 10 is to be received is shown. The panel 50 has an aperture 52 therethrough with two oppositely disposed keyways 54 spaced approximately 180° apart provided in the surface defining the aperture 52. The diameter of the aperture 52 is slightly greater than the largest diameter of the body portion 12, other than the diameter of the flange portion 44 and the distance between outer surfaces 56 of the keyways 54 is slightly greater than the distance between the inner ends 38 of the oppositely disposed arms 14. In order to receive the housing 10 within the panel 50, the end 58 of the body portion 12 is received through the aperture 52 in the panel 50 and is permitted to pass therethrough until surface 28 of the shoulder portion 22 of the arms 14 contacts the outer surface 60 of the panel 50. The housing 10 is then rotated until the arms 14 are aligned with the keyways 54 and further advancement of the housing 10 through the aperture 52 in the panel 50 causes the lead-in portion 16 and the middle portion 20 of each arm 14 to pass through its complementary keyway 54. Further advancement of the housing 10 through the aperture 52 in the panel 50 causes the surface 56 of the keyway 54 to engage the outer surface 62 of the ramp portion 18 of the complementary arm 14 resulting in the arm 14 being deflected inwardly toward the body portion 12. As the outer end 30 of each arm 14 passes through its complementary keyway 54, surface 52 of the keyway 54 traverses the surface defining the rounded projection 34 permitting the arm 14 to spring outwardly causing the surface 36 on each arm 14 to engage surface 56 on its complementary keyway 54. Because of the angular orientation of the surface 36 of the arm 14 relative to surface 56 of the keyway 54, the outward springing of the arm 14 urges further advancement of the housing 10 through the aperture 52 in the panel 50 until the outer surface 60 of the panel 50 firmly engages inner surface 48 on circumferential flange portion 44 of the body portion 12 of the housing 10. The thickness of the panel 50 utilized determines the location on the surface 36 of each arm 14 that ultimately engages surface 56 on keyway 54 when the outer surface 60 of the panel 50 is in firm engagement with inner surface 48 on circumferential flange portion 44 of the body portion 12. Thus, various panel thicknesses can be accommodated using this housing structure. The angular orientation of surfaces 36 also prevents the disengagement of the arm 14 with its complementary keyway 54 as a result of inadvertent movement of the housing 10 within aperture 52. That is, movement of the housing 10, such as a rocking motion within the aperture 52, causes the commensurate movement of surfaces 36 relative to their mating surfaces 56 on respective complementary keyways 54 resulting in the continued engagement of the housing 10 within the panel 50 by means of the arms 14. Also, longitudinal movement of the housing 10 toward the panel 50 results in surface 34 on the end of on each arm 14 engaging the inner surface 64 of the panel 50 resulting in the continued engagement of the housing 10 within the panel 50. Thus, the surfaces 34 act as a mechanical stop preventing the disengagement of surface 36 on each arm 14 from surface 56 on its complementary keyway 54.

The foregoing housing structure also permits the removal of the housing 10 from the panel 44. In order to accomplish such removal, the arms 14 are pressed inwardly by means of inwardly directed pressure on the middle portions 20 thereof resulting in the inward deflection of the ramp portion 18 of each arm 14 toward the body portion 12. While this is occurring, the housing 10 is moved in a longitudinal direction so as to break contact between the inner surface 48 on the circumferential flange portion 44 of the body portion 12 and the outer surface 60 of the panel 50. Sufficient inward deflection of each arm 14 permits the outer end 30 of its ramp portion 18 to pass through its adjacent complementary keyway 54. Further longitudinal movement of the housing 10 through the panel 50 permits the ramp portion 18, the middle portion 20 and the lead-in portion 16 of each arm 14 to pass through its complementary keyway 54 allowing the housing 10 to be removed from the panel 50.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A housing which is receivable within an aperture in a panel and engageable with the panel comprising a body member having a flange portion adjacent one end thereof, and at least one arm member attached to said body member, said arm member being defined by an outer surface, an inner surface, and substantially parallel side surfaces interconnecting said outer and inner surfaces, said arm member having a first portion, a second portion, and a third portion, said first portion being attached to said body member, said second portion being outwardly directed from said body member and said third portion interconnecting said first and second portions, the longitudinal as of said third portion of said arm member being substantially parallel to the longitudinal as of said body member, said second portion of said arm member terminating in an outer end defined by a surface comprising a first surface portion adjacent said inner surface of said arm member and a second surface portion adjacent said outer surface of said arm member, said first surface portion being angularly directed toward said flange portion of said body member, and said second surface portion being angularly oriented with respect to said first surface portion, said first surface portion engaging the surface defining the aperture in the panel, said second surface portion acting as a mechanical stop by engaging the surface of the panel in response to movement of the housing within the panel.

2. The housing as defined in claim 1 wherein said first portion of said arm member includes a surface that is angularly offset from the longitudinal axis of said body member, said angularly offset surface acting as a lead-in surface when said housing is being received within the aperture in the panel.

3. The housing as defined in claim 1 including two oppositely disposed arm members attached to said body member, said two arm members being substantially equally angularly positioned relative to one another.

4. The housing as defined in claim 1 wherein said at least one arm member is positioned relative to said flange portion of said body member so that the space therebetween approximates the thickness of the panel in which the housing is to be mounted.

5. The housing as defined in claim 1 wherein said body member and said arm member are integrally molded.

6. The housing as defined in claim 1 wherein said second portion of said arm member has an increasing cross-sectional thickness in the transverse direction from the approximate junction of said second portion with said third portion of said arm member to said outer end thereof.

* * * * *